(12) United States Patent
Zuo

(10) Patent No.: US 10,777,157 B2
(45) Date of Patent: Sep. 15, 2020

(54) LIQUID CRYSTAL DISPLAY PANEL HAVING PIXEL UNITS WITH DIFFERENCE STORAGE CAPACITANCE

(71) Applicant: Wuhan China Star Optoelectronics Technology Co., Ltd., Wuhan (CN)

(72) Inventor: Qingcheng Zuo, Shenzhen (CN)

(73) Assignee: WUHAN CHINA STAR OPTOELECTRONICS TECHNOLOGY CO., LTD., Wuhan (CN)

(*) Notice: Subject to any disclaimer, the term of this patent is extended or adjusted under 35 U.S.C. 154(b) by 0 days.

(21) Appl. No.: 16/208,489

(22) Filed: Dec. 3, 2018

(65) Prior Publication Data

US 2019/0371257 A1    Dec. 5, 2019

Related U.S. Application Data

(63) Continuation of application No. PCT/CN2018/097420, filed on Jul. 27, 2018.

(30) Foreign Application Priority Data

May 31, 2018 (CN) .......................... 2018 1 0553532

(51) Int. Cl.
*G09G 3/36* (2006.01)
*G02F 1/1362* (2006.01)

(52) U.S. Cl.
CPC ..... *G09G 3/3648* (2013.01); *G02F 1/136213* (2013.01); *G02F 1/136277* (2013.01); *G02F 1/136286* (2013.01); *G09G 2310/0243* (2013.01); *G09G 2310/0297* (2013.01)

(58) Field of Classification Search
CPC ..................................................... G09G 3/3648
USPC ........................................................ 345/204
See application file for complete search history.

(56) References Cited

U.S. PATENT DOCUMENTS

| 9,542,874 | B2 | 1/2017 | Park et al. | |
|---|---|---|---|---|
| 2011/0316837 | A1* | 12/2011 | Lee | G09G 3/3648 345/211 |
| 2018/0151145 | A1* | 5/2018 | Lee | G09G 3/3614 |

FOREIGN PATENT DOCUMENTS

| CN | 104992681 A | 10/2015 |
|---|---|---|
| CN | 106205526 A | 12/2016 |
| CN | 106526998 A | 3/2017 |
| CN | 106652930 A | 5/2017 |

* cited by examiner

*Primary Examiner* — Long D Pham

(57) ABSTRACT

The present disclosure provides a pixel substrate, a liquid crystal display panel and liquid crystal display device, the pixel substrate includes liquid crystal pixels, TFT, source lines, grid lines, common electrodes, and corresponding storage capacitances, the liquid crystal pixels include a plurality of pixel units, each of the source lines is connected to the source/drain electrode of at least two columns of the pixel units, and the storage capacitance corresponding to one column of the pixel units is larger than the storage capacitance corresponding to any other column of the pixel units. The present disclosure reduces the effect of the feed-through voltage on the display effect while reducing the power consumption.

20 Claims, 4 Drawing Sheets

US 10,777,157 B2

LIQUID CRYSTAL DISPLAY PANEL HAVING PIXEL UNITS WITH DIFFERENCE STORAGE CAPACITANCE

CROSS-REFERENCE TO RELATED APPLICATIONS

The present application is a continuation-application of International (PCT) Patent Application No. PCT/CN2018/097420 filed on Jul. 27, 2018, which claims foreign priority of Chinese Patent Application No. 201810553532.6, filed on May 31, 2018 in the State Intellectual Property Office of China, the entire contents of which are hereby incorporated by reference.

TECHNICAL FIELD

The present disclosure relates to a technical field of display technology, and particularly to a pixel substrate, a liquid crystal display panel and a liquid crystal display device.

BACKGROUND

With the rapid development of the technology of TFT-LCD, it is expected that high-definition image of LCD display device should be provided, in other words, people have higher requirements on the resolution of LCD display device. However, the number of source lines required by the source integrated circuit increases as the resolution increases. Generally, charging the sub-pixels may be achieved by time-division multiplexing of MUX such that the number of output source lines of the source integrated circuit may be reduced.

In related art, TFT-LCD panel is generally made up by Demux driver architecture, as shown in FIG. 2 and FIG. 3. FIG. 2 is a schematic structural view of an embodiment of 1:3 Demux driver provided by the related art. In FIG. 2, the Demux driver may include switch signal lines which comprising a first signal line 201, a second signal line 202, a third signal line 203. And the Demux driver may further include a plurality of grid lines 204, a plurality of source lines 205 and a pixel unit group 206 arranged in order of R pixels, G pixels and B pixels. The source/drain electrode of each R pixel is connected to one of the source lines 205, the grid electrode of each R pixel is connected to one of the grid line 204. And each R pixel may be charged by the grid line 204 and the first signal line 201 of the Demux driver. The source/drain electrode of each G pixel is connected to one of the source lines 205, the grid electrode of each G pixel is connected to the grid line 204. And each G pixel may be charged by the grid line 204 and the second signal line 202 of the Demux driver. The source/drain electrode of each B pixel is connected to one of the source lines 205, the grid electrode of each B pixel is connected to the grid line 204. And each B pixel may be charged by the grid line 204 and the third signal line 203 of the Demux driver. FIG. 3 is a schematic view of control timing sequence of an embodiment of 1:3 Demux driver provided by the related art. Curves 301, 302 and 303 in FIG. 3 are electrical level corresponding to the first signal line 201, the second signal line 202 and the third signal line 203 in the Demux driver. Curves 304 and 305 are the electrical level corresponding to a first grid line and a second grid line in the Demux driver. As shown in the FIG. 2 and FIG. 3, the specific implementation of the Demux driver is as follows: taking the case of two grid lines as an example, when the first grid line controls the corresponding grid electrodes to be turned on, the control switches of the first signal line, the second signal line and the third signal line of the Demux driver are opened in turn, and corresponding to the R pixels, G pixels and B pixels. The first signal line 201, the second signal line 202, the third signal line 203 have the same frequency. When one period charging instruction of the corresponding R pixels, G pixels and B pixels have been finished, the first grid line controls the corresponding grid electrodes to be turned off, and the second grid line controls the corresponding grid electrodes to be turned on, then the charging command for the corresponding R pixels, G pixels and B pixels in the next period is executed. At this time, the sequence period of the turn-on time of the switch signal lines may be: the first signal line, the second signal line, and the third signal line. The charging sequence period of corresponding pixel units is R→G→B.

Based on the above Demux driver mode, a Demux drive solution is provided to reduce power consumption. But there are two kinds of feed-through voltage in different pixel units as using the new Demux drive solution for reducing power consumption. Generally, there is only one type of common electrode voltage Vcom. If the Demux drive solution mentioned above is adopted for reducing power consumption, the two different feed-through voltages may affect the common electrode voltage, thereby affecting the display effect of the LCD device.

SUMMARY

This present disclosure provides a pixel substrate, a liquid crystal display panel and liquid crystal display device, which are used to solve the problems that the two different feed-through voltages may affect the common electrode voltage when the Demux drive solution with reduced power consumption is used, thereby affecting the display effect of LCD device.

In order to solve the above technical problem, one of the technical solutions adopted in the present disclosure is to provide a pixel substrate. The pixel substrate may include liquid crystal pixels, TFT, source lines, grid lines, common electrodes, and corresponding storage capacitances. The TFT may be disposed among the source lines, the grid lines and the liquid crystal pixels. The liquid crystal pixels may include a plurality of pixel units, each of the source lines may be connected to the source/drain electrode of at least two columns of the pixel units, and the storage capacitance corresponding to one column of the pixel units may be larger than the storage capacitance corresponding to any other column of the pixel units.

In order to solve the above technical problem, another technical solution adopted in the present disclosure is to provide a liquid crystal display panel including a pixel substrate. The pixel substrate may include liquid crystal pixels, TFT, source lines, grid lines, common electrodes, and corresponding storage capacitances. The TFT may be disposed among the source lines, the grid lines and the liquid crystal pixels. The liquid crystal pixels may include a plurality of pixel units, each of the source lines may be connected to the source/drain electrode of at least two columns of the pixel units, and the storage capacitance corresponding to one column of the pixel units may be larger than the storage capacitance corresponding to any other column of the pixel units.

In order to solve the above technical problem, another technical solution adopted in the present disclosure is to provide a liquid crystal display device including a liquid crystal display panel. The liquid crystal display panel may include a pixel substrate. The pixel substrate may include liquid crystal pixels, TFT, source lines, grid lines, common electrodes, and corresponding storage capacitances. The TFT may be disposed among the source lines, the grid lines and the liquid crystal pixels. The liquid crystal pixels may include a plurality of pixel units, each of the source lines may be connected to the source/drain electrode of at least two columns of the pixel units, and the storage capacitance corresponding to one column of the pixel units may be larger than the storage capacitance corresponding to any other column of the pixel units.

The beneficial effect of the above embodiments lies in that: the present disclosure provides a pixel substrate, a liquid crystal display panel and a liquid crystal display device. The storage capacitance of one column of the pixel units corresponding to the source lines in the pixel substrate may be setting larger than that of any other column of the pixel units, such that the effect of two different feed-through voltage on the display performance of a liquid crystal device may be reduced, and the display quality of the liquid crystal panel may be improved with reducing power consumption.

DETAILED DESCRIPTION

The technical solutions in the embodiments of the present disclosure will be clearly described as follows. Apparently, the described embodiments are merely a part but not all of the embodiments of the present disclosure. All other embodiments obtained by the ordinary skilled in the art according to the embodiments of the present disclosure without any creative efforts shall fall into the protection scope of the present disclosure.

Figure 1:
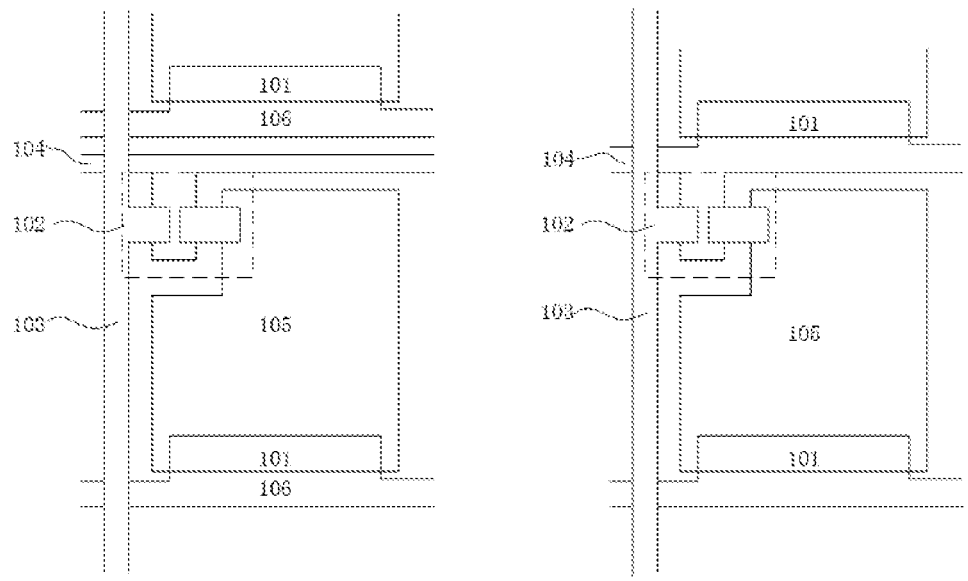
FIG. 1 is a schematic structural view of an embodiment of pixel substrate according to the present disclosure.

The present disclosure provides a pixel substrate, referring to FIG. 1. FIG. 1 is a schematic structural view of an embodiment of a pixel substrate provided by the present disclosure. As shown in FIG. 1, the pixel substrate may include: TFT 102, source lines 103, grid lines 104, liquid crystal pixels 105, common electrodes 106 and corresponding storage capacitance 101. The TFT 102 may be disposed among the source line 103, the grid line 104 and the liquid crystal pixel 105. One end of the storage capacitance 101 may be connected to the common electrode 106. In other embodiments, one end of the storage capacitance 101 may be connected to the grid lines 104, and other structure arrangements are similar to the embodiment in which one end of the storage capacitance 101 is connected to a common electrode 106.

The pixel substrate may include a plurality of pixel units, and these pixel unites are arranged in an array. Each of the source lines 103 is connected to source/drain electrode of at least two columns of the pixel units, and the storage capacitance 101 corresponding to one column of the pixel units is larger than the storage capacitance 101 corresponding to any other columns of the pixel units.

A specific analysis of an embodiment of a 1:3 Demux driver architecture will be described as follow. The technical solution of this embodiment is achieved based on the 1:3 Demux driver architecture in FIG. 2 and the 1:3 Demux driver method in FIG. 4 for reducing power consumption. Specifically, referring to FIG. 2 and FIG. 4, the liquid crystal pixels of the embodiment provided by the present disclosure may be grouped in a plurality of pixel units. Each three adjacent columns of the pixel units in the same row may be grouped into one pixel units group. Each of these pixel units groups may include a first pixel unit, a second pixel unit and a third pixel unit. The first pixel unit, the second pixel unit and the third pixel unit may be arranged alternately in this grouping manner. More specifically, the first pixel unit, the second pixel unit and the third pixel unit may be respectively arranged as R pixel, G pixel and B pixel. In general, the values of the storage capacitance corresponding to the R pixels, the G pixels and the B pixels may be equal. The source/drain electrodes of the R pixels may be connected to the source lines. The grid electrodes of the R pixels may be connected to the grid lines. And the R pixels may be charged by the controlling of the grid lines and a first signal line of the Demux driver. The source/drain electrodes of the G pixels may be connected to the source lines. The grid electrodes of the G pixels may be connected to the grid lines. And the G pixels may be charged by the controlling of the grid lines and a second signal line of the Demux driver. The source/drain electrodes of the B pixels may be connected to the source lines. The grid electrodes of the B pixels may be connected to the grid lines. And the B pixels may be charged by the controlling of the grid lines and a third signal line of the Demux driver.

Taking the case of two grid lines as an example, when the first grid line controls the corresponding grid electrode to be turned on, controlling switches of the first signal line, the second signal line and third signal line respectively corresponding to the R pixels, the G pixels and the B pixels of the Demux driver may turned on sequentially. The first signal line, the second signal line and the third signal line have the same frequency. When a charging instruction of the R pixels, the G pixels and the B pixels has been executed once time, only a half cycle of the charging process has been performed at this time, the first grid line may control the corresponding grid electrode to be turned off and the second grid line may control the corresponding grid electrode to be turned on. Then a charging instruction of another half cycle of the charging process may be executed in the order of the B pixels, the G pixels and the R pixels, thereby completing a one-cycle charging process. In other words, the opening sequence period of the first signal line, the second signal line and the third signal line of the Demux driver controlled by the grid line may be: the first signal line, the second signal line, the third signal line, the third signal line, the second signal line and the first signal line. The corresponding charging sequence period of the pixel units may be:

R→G→B→B→G→R

The advantage of this charging method is that the frequency of the first signal line and the third signal line may be reduced by half, so that power consumption may be reduced.

Further, each pixel units will be described as follow. For the G pixels, in all timing sequence states, the voltage of the G pixels may be affected twice by parasitic effects caused by the grid electrode turning off. One effect may be caused by the feed-through voltage $\Delta V_1$ when the level of the second signal lines corresponding to the G pixels changes from a high level to a low level. Another effect may be caused by the feed-through voltage $\Delta V_2$ when the level of the grid lines corresponding to the G pixels changes from a high level to a low level.

Figure 2:
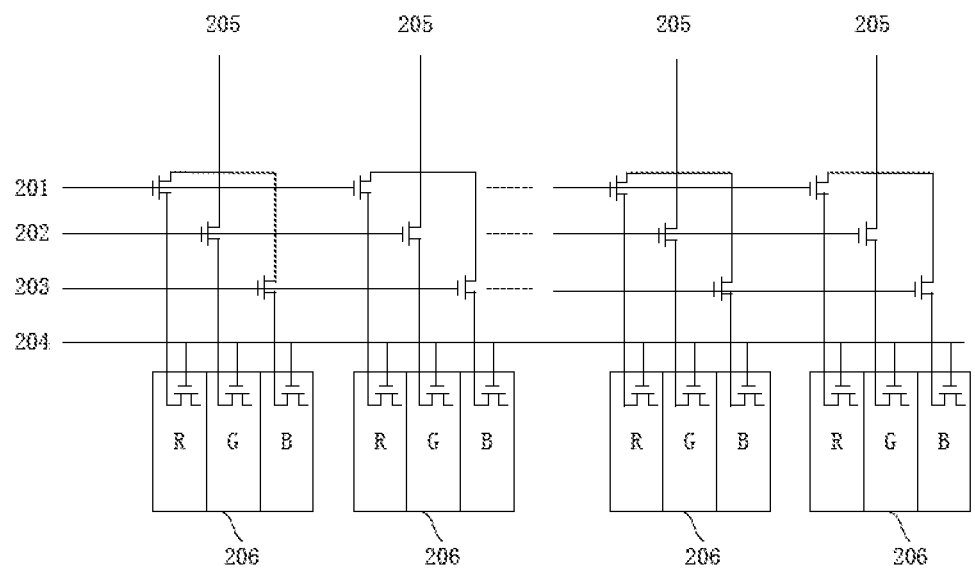
FIG. 2 is a schematic structural view of an embodiment of a 1:3 Demux driver of the related art.
Figure 3:
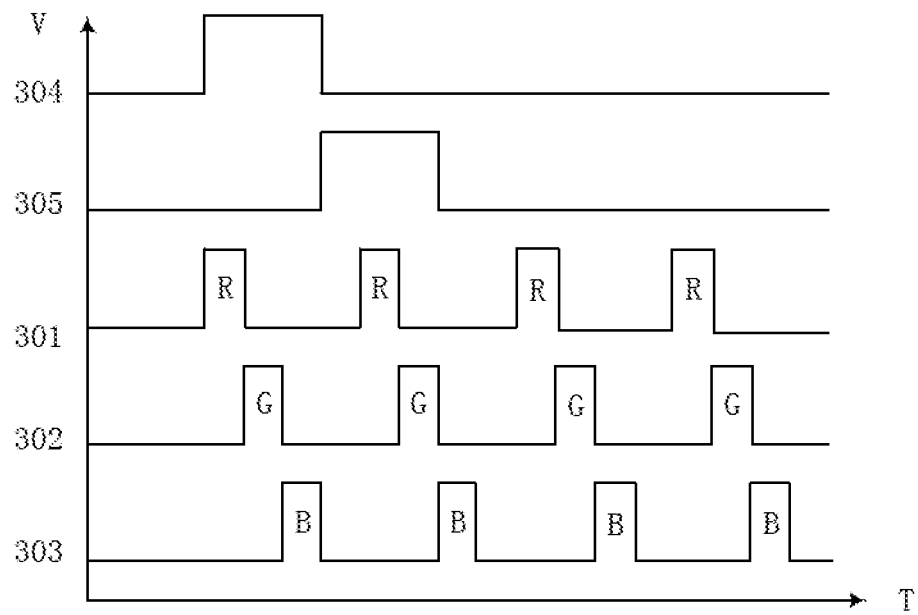
FIG. 3 is a schematic view of control timing sequence of an embodiment of a 1:3 Demux driver of the related art.
Figure 4:
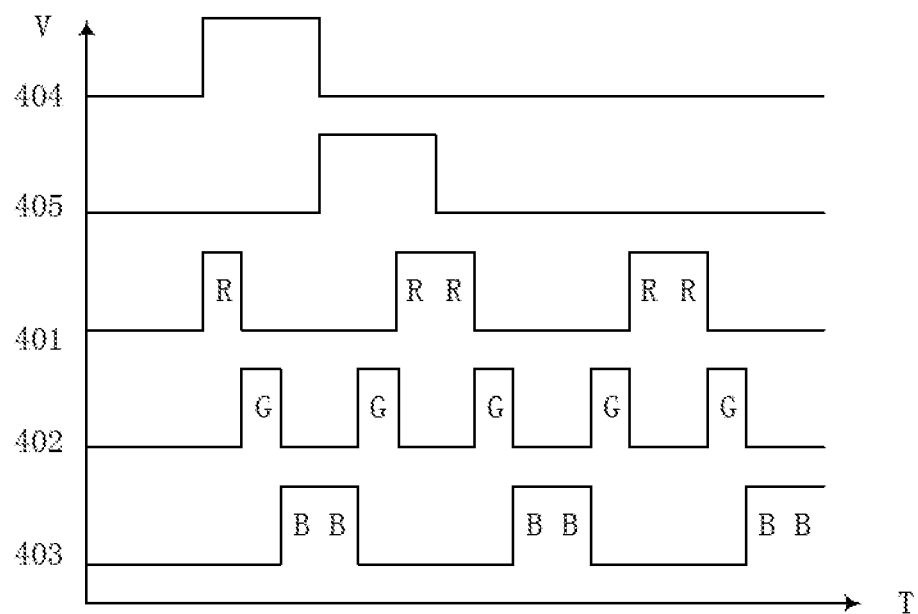
FIG. 4 is a schematic view of control timing sequence of an embodiment of reducing power consumption in a 1:3 Demux driver architecture according to the present disclosure.

For the R pixels, taking the case of two grid lines in FIG. 4 as an example, in the half cycle of the timing sequence period in which the first grid line controls the corresponding grid electrodes turning on or off, a first source line corresponding showed in FIG. 2 may also cooperate with the first grid line to perform the operation of the controlling at the same time, the voltage of the R pixels may be affected twice by parasitic effects caused by the grid electrodes turning off One effect may be caused by the feed-through voltage $\Delta V_1$ when the level of the first signal lines corresponding to the R pixels changes from a high level to a low level. Another effect may be caused by the feed-through voltage $\Delta V_2$ when the level of the grid lines corresponding to the R pixels changes from a high level to a low level. In the half cycle of the timing sequence period in which the second grid line controls the corresponding grid electrodes turning on or off, a second source line corresponding showed in FIG. 2 may also cooperate with the second grid line to perform the operation of the controlling at the same time, the voltage of the R pixels may be affected only once by parasitic effect caused by the grid electrodes turning off. The effect may be caused by the feed-through voltage $\Delta V_2$ when the level of the grid lines corresponding to the R pixels changes from a high level to a low level. By analogy, in the odd sequence of the source lines, such as first source line, third source line, fifth source line and so on, the R pixel may be affected twice by parasitic effects caused by the grid electrodes turning off, and the feed-through voltage may be $\Delta V_1 + \Delta V_2$. In the even sequence of the source lines, such as source second line, fourth source line, sixth source line and so on, the R pixel may be affected only once by parasitic effects caused by the grid electrodes turning off, and the feed-through voltage may be $\Delta V_2$.

For the B pixels, taking the case of two grid lines in FIG. 4 as an example, in the half cycle of the timing sequence period in which the first grid line controls the corresponding grid electrodes turning on or off the first source line corresponding showed in FIG. 2 may also cooperate with the first grid line to perform the operation of the controlling at the same time, the voltage of the B pixels may be affected only once by parasitic effect caused by the grid electrodes turning off. This effect may be caused by the feed-through voltage $\Delta V_2$ when the level of the grid lines corresponding to the B pixel changes from a high level to a low level. In the half cycle of the timing sequence period in which the second grid line controls the corresponding grid electrodes turning on or off, the second source line corresponding showed in FIG. 2 may also cooperate with the second grid line to perform the operation of the controlling at the same time, the voltage of the B pixels may be affected twice by parasitic effects caused by the grid electrodes turning off. One effect may be caused by the feed-through voltage $\Delta V_1$ when the level of the third signal lines corresponding to the B pixels changes from a high level to a low level. Another effect may be caused by the feed-through voltage $\Delta V_2$ when the level of the grid lines corresponding to the B pixels changes from a high level to a low level. By analogy, in the odd sequence of the source lines, such as first source line, third source line, fifth source line and so on, also during the first pixel units execution, the B pixels may be affected only once by parasitic effect cause by the grid electrodes turning off with the feed-through voltage $\Delta V_2$. In the even sequence of the source lines, such as second source line, fourth source line, and sixth source line, etc., also during the second pixel units' execution, the B pixels may be affected twice by parasitic effect cause by the grid electrodes turning off with the feed-through voltage $\Delta V_1 + \Delta V_2$.

In other embodiments, a 1:n Demux driver architecture may be provided, such as 1:2, 1:6, etc., where n is an integer greater than or equal to 2. The principle of which is similar to the 1:3 Demux driver architecture mentioned above.

Figure 5:
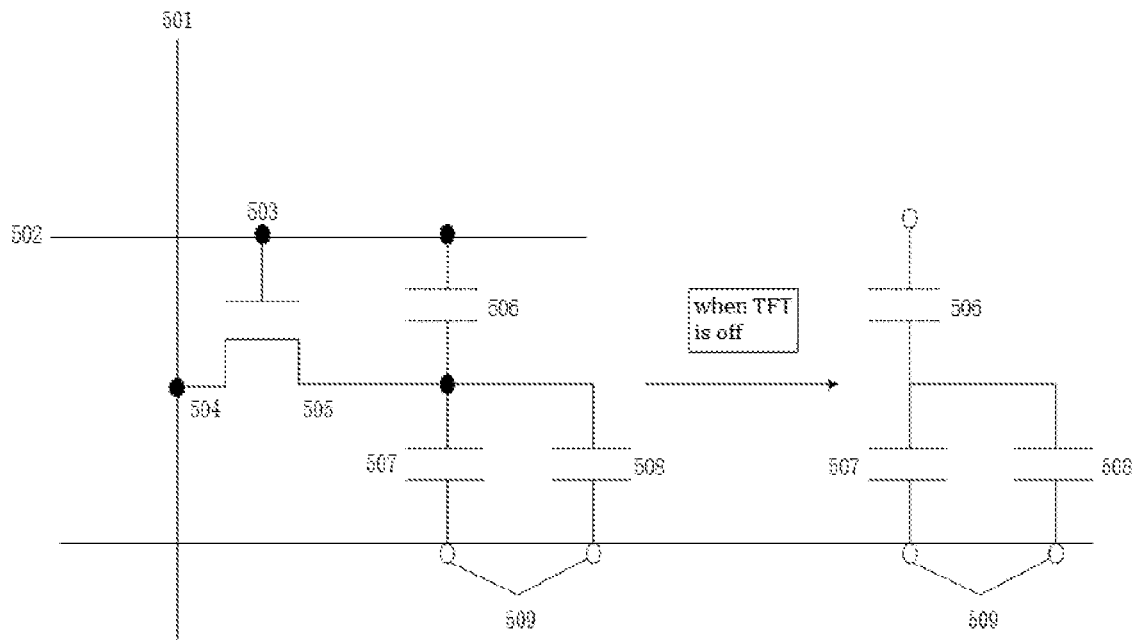
FIG. 5 is a schematic structural view of an embodiment of parasitic capacitance $C_{st}$ in a liquid crystal panel provided by the present disclosure.
Figure 6:
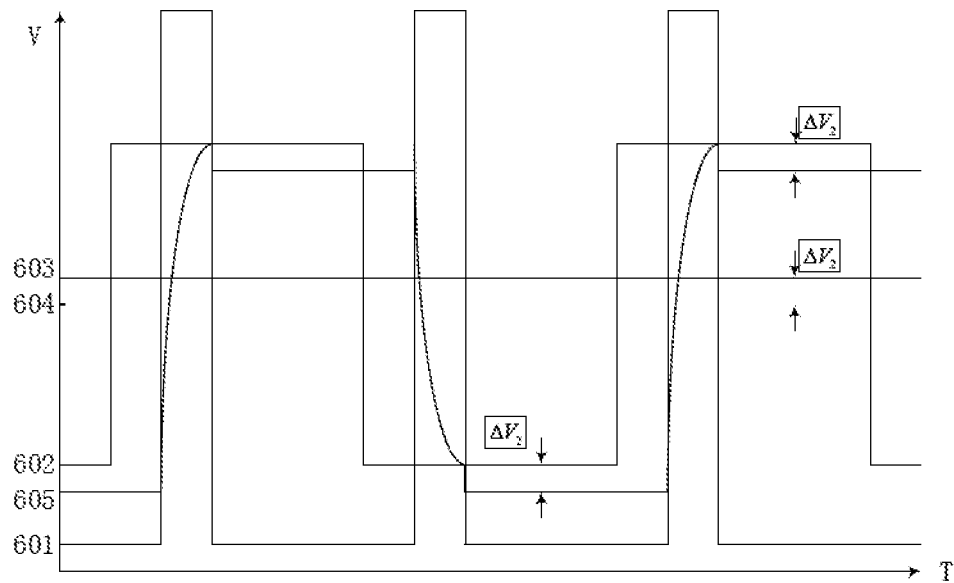
FIG. 6 is a schematic diagram of the principle of generating a second feed-through voltage $\Delta V_2$ in the present disclosure.

Referring to FIG. 5 and FIG. 6, FIG. 5 is a schematic structural view of an embodiment of parasitic capacitance $C_{st}$ in a liquid crystal panel. A source line 501, a grid line 502, a grid electrode 503, a drain electrode 504, a source electrode 505, parasitic capacitances 506, storage capacitances 507, liquid crystal capacitances 508 and common electrodes 509 are shown in FIG. 5. FIG. 6 is a schematic view of generating a second feed-through voltage $\Delta V_2$ provided by the present disclosure. FIG. 6 shows a grid line signal voltage curve 601, a source line signal voltage curve 602, a initial common electrode voltage curve 603, a common electrode voltage curve 604 affected from a feed-through voltage, and a actual display electrode voltage curve 605 which is a source electrode voltage curve. The generation of the second feed-through voltage $\Delta V_2$ will be described in detail as below with reference to FIG. 5 and FIG. 6. The parasitic capacitance 506 in FIG. 5 is disposed and present all time between the grid electrode 503 and the source electrode 505. When a TFT in FIG. 5 is turned off, a multi-capacitor structure in which the parasitic capacitance 506 is connected in series with the storage capacitance 507 and the liquid crystal capacitance 508 is formed. At this time, the overall charge of the above multi-capacitor structure is always constant regardless of whether the grid electrode 503 is at a high level or a low level, the overall charge of the above multi-capacitance structure remains constant. Therefore, according to the law of charge conservation, the overall charge value of the multi-capacitance structure when the grid electrode 503 is at a high level or a low level may be separately calculated. When the grid electrode 503 is at a high level $V_g = V_{gh}$, the overall charge is:

$$Q = (V_{gh} - V_s) * C_{gs} + (V_{com} - V_s) * (C_{st} + C_{lc})$$

When the grid electrode 503 is at a low level $V_g = V_{gh}$, the overall charge is:

$$Q = (V_{gh} - V_s) * C_{gs} + (V_{com} - V'_s) * (C_{st} + C_{lc})$$

Herein, $V_s$ is a voltage of the source electrode 505 when the grid electrode 503 is at a high level, $V'_s$ is a voltage of the source electrode 505 when the grid electrode 503 is at a low level, $V_{com}$ is a voltage of the common electrodes 509, $C_{st}$ is a value of the storage capacitance 507, $C_{lc}$ is a value of the liquid crystal capacitance 508. Generally, the voltage of the drain electrode 504 is nearly equal to the voltage of the source electrode 505. However, due to the existence of the parasitic capacitance 506, a level difference may be generated between the source line signal voltage curve 602 and the source electrode voltage curve 605 after the grid line signal voltage curve 601 turns from a high level to a low level, which is because a feed-through phenomenon may be generated in the coupling effect of the parasitic capacitance 506 when the grid line signal voltage changes. Therefore, a level difference of the initial common electrode voltage cure 603 and the common electrode voltage curve 604 affected by the feed-through voltage may be also equal to the above level difference. So the second feed-through voltage $\Delta V_2$ may be expressed as:

$$\Delta V_2 = V_s - V'_s$$

Combining the above three equations, the second feed-through voltage may be obtained:

$$\Delta V_2 = (V_{gh} - V_{gl}) * C_{gs} / (C_{st} + C_{lc} + C_{gs})$$

Figure 7:
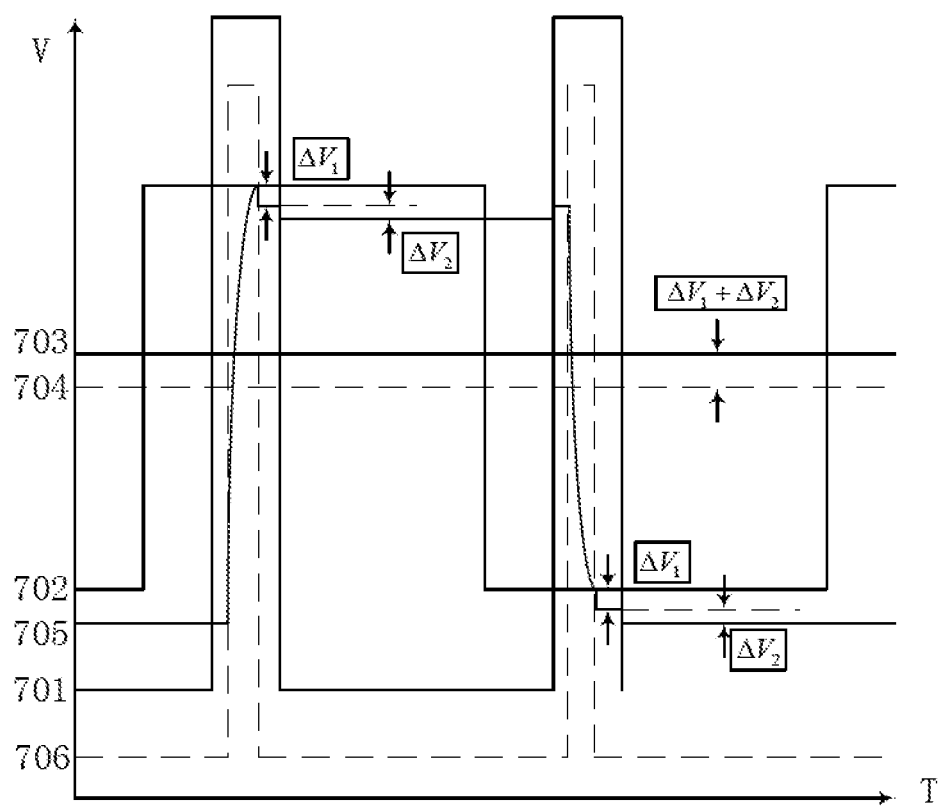
FIG. 7 is a schematic diagram of the principle of generating a first feed-through voltage $\Delta V_1 + \Delta V_2$ in the present disclosure.

Referring to FIG. 7, FIG. 7 is a schematic view of generating a first feed-through voltage $\Delta V_1 + \Delta V_2$ provided by the present disclosure. FIG. 7 shows a grid line signal voltage curve 701, a source line signal voltage curve 702, a initial common electrode voltage curve 703, a common electrode voltage curve 704 affected from a feed-through voltage, a actual display electrode voltage curve 705 which is a source electrode voltage curve, and a Demux driver signal voltage curve 706. The generation of the first feed-through voltage $\Delta V_1 + \Delta V_2$ will be described in detail as below with reference to FIG. 5 and FIG. 7. Due to the existence of the parasitic capacitance 506, a first level drop $\Delta V_1$ of the source line signal voltage curve 702 and the source electrode voltage curve 705 may be generated after the Demux driver signal voltage curve 706 turns from a high level to a low level. Subsequently, after the grid line signal voltage curve 701 turns from a high level to a low level, a second level drop of the source electrode voltage curve 705 may be generated. The second level drop is $\Delta V_2$ compared with the source electrode voltage curve 705 with first level drop. Under the combined action of the Demux driver signal voltage change and the grid line signal voltage change, the total level difference between the source line signal voltage curve 702 and the source electrode voltage curve 705 may be $\Delta V_1 + \Delta V_2$ which is generated due to a feed-through phenomenon in the coupling effect of the parasitic capacitance 506 when the grid line signal voltage changes. Therefore, a level difference of the initial common electrode voltage cure 703 and the common electrode voltage curve 704 affected by the feed-through voltage may be also equal to the above level difference. According to the calculation method similar to the second feed-through voltage, the first feed-through voltage $\Delta V_1$ may be expressed as:

$$\Delta V_1 + \Delta V_2 = (V_{gh} - V_{gl}) * C_{gs} / (C_{eq} + C_{gs})$$

Herein, $C_{eq}$ is a parasitic equivalent capacitance of a multi-capacitor structure on the data line, including a parasitic capacitance, a storage capacitance, and a liquid crystal capacitance, etc.

According to the above analysis, it can be seen that when the grid line controls the corresponding grid electrode to be turned off, a feed-through voltage generated at the R pixels in the even timing sequence of the source lines and at the B pixels in the odd timing sequence of the source lines may be the second feed-through voltage $\Delta V_2$. In order to avoid the adverse effect of the feed-through effect, a technical solution is provided by the present disclosure: a pixel substrate is provided with increasing storage capacitance of R pixels in an even timing sequence state and B pixels in an odd timing sequence state when corresponding grid electrodes are turned off. That is, the storage capacitance corresponding to R pixel columns in the odd timing sequence state may be larger than the storage capacitance corresponding to G pixel columns or B pixel columns, and the storage capacitance corresponding to the B pixel columns in the even timing sequence state may be larger than the storage capacitance corresponding to the G pixel columns or the R pixel columns. Meanwhile, the driving frequency of Demux driver corresponding to the R pixels in the odd timing sequence state may be higher than the driving frequency corresponding to the B pixels in the even timing sequence state. Since the capacitance C is proportional to the plate area S, the capacitance C is inversely proportional to the distance d between the plates. Therefore, the feed-through adverse effect may be avoided by increasing the plate area S or reducing the distance d between the plates of the corresponding pixel storage capacitor. That is, under the Demux driving, the plate area of the storage capacitance corresponding to the R pixel columns in the even timing sequence state may be larger than the plate area of the storage capacitance corresponding to the G pixel columns or the B pixel columns, and the plate area of the storage capacitance corresponding to the B pixel columns in the odd timing sequence state may be larger than the plate area of the storage capacitance corresponding to the G pixel columns or the R pixel columns. Alternatively, the plate pitch of the storage capacitance corresponding to the R pixel columns in the even timing sequence state may be less than the plate pitch of the storage capacitance corresponding to the G pixel columns or the B pixel columns, and the plate pitch of the storage capacitance corresponding to the B pixel columns in the odd timing sequence state may be less than the plate pitch of the storage capacitance corresponding to the G pixel columns or the R pixel columns.

Before the grid line controls the corresponding grid electrode to be turned off, a feed-through voltage generated at the R pixels in the odd timing sequence of the source lines and at the B pixels in the even timing sequence of the source lines may be the first feed-through voltage $\Delta V_1 + \Delta V_2$. In order to avoid the adverse effect caused by the feed-through effect, a technical solution is provided by the present disclosure: a pixel substrate is provided with reducing storage capacitance of R pixels in an odd timing sequence state and B pixels in an even timing sequence state of a source line. That is, the storage capacitance corresponding to R pixel columns in the oven number timing sequence state may be larger than the storage capacitance corresponding to G pixel columns or B pixel columns, and the storage capacitance corresponding to the B pixel columns in the odd timing sequence state may be larger than the storage capacitance corresponding to the G pixel columns or the R pixel columns. Meanwhile, under the Demux driving, the driving frequency corresponding to the R pixels of a first pixel unit may be lower than the driving frequency corresponding to the R pixels of a second pixel unit, and the driving frequency corresponding to the B pixels of the first pixel unit may be higher than the driving frequency corresponding to the B pixels of the second pixel unit. At the same time, it is also possible to reduce the storage capacitance corresponding to the G pixels in all timing sequence state, that is, to reduce the storage capacitance corresponding to all the G pixel columns. Since the capacitance C is proportional to the plate area S, the capacitance C is inversely proportional to the distance d between the plates. So, the feed-through adverse effect may be avoided by reducing the plate area S or increasing the distance d between the plates of the corresponding pixel storage capacitor. At this time, under the Demux driving, the plate area of the storage capacitance corresponding to the R pixel columns in the even timing sequence state may be larger than the plate area of the storage capacitance corresponding to the G pixel columns or the B pixel columns, and the plate area of the storage capacitance corresponding to the B pixel columns in the odd timing sequence state may be larger than the plate area of the storage capacitance corresponding to the G pixel columns or the R pixel columns. That is, the plate area of the storage capacitance corresponding to all the G pixel columns may be reduced. Alternatively, the plate pitch of the storage capacitance corresponding to the R pixel columns in the even timing sequence state may be less than the plate pitch of the storage capacitance corresponding to the G pixel columns or the B pixel columns, and the plate pitch of the storage capacitance corresponding to the B pixel columns in the odd timing sequence state may be less than the plate pitch of the storage capacitance corresponding to the G pixel columns or the R pixel columns. That is, the plate pitch of the storage capacitance corresponding to all the G pixel columns may be increased.

In conclusion, for the above embodiments, whether in an odd timing sequence state or an even timing sequence state, there is always one column of pixel units with corresponding storage capacitance being larger than that of any other column of pixel units. That is, there is always one column of pixel units with corresponding storage capacitance plate area being larger than that of any other column of pixel units, or there is always one column of pixel units with corresponding storage capacitance plate pitch being less than that of any other column of pixel units.

In other embodiments, the first pixel unit, the second pixel unit, and the third pixel unit mentioned above are not necessarily only arranged in accordance with the order of R pixel, G pixel, B pixel, but also may be arranged with the order of G pixels. R pixel, B pixels, or other arrangement. The principle is as same as that of the above arrangement, and embodiments are also similar to that of the above arrangement.

In other embodiments, It is also possible to change the permittivity by changing the dielectric material between plates to achieve the purpose of changing the storage capacitance of corresponding pixels and avoiding the adverse effect caused by feed-through effect. However, since changing the dielectric material between plates will cause many parameters to change at the same time, and then the situation is more complicated because of the increase influencing factors. Therefore, it is not described in detail here.

Different from the related art, the present disclosure provides a pixel substrate, which may reduce the effect of two feed-through voltages on the display effect of the liquid crystal display device by setting the storage capacitance of one column of pixel units corresponding to the source line in the pixel substrate to be larger than the storage capacitance of any other column of pixel units. The display quality of the liquid crystal panel may be improved on the basis of reducing power consumption.

A liquid crystal display panel including any of the foregoing pixel substrates may be provided by the present disclosure.

Different from the related art, the present disclosure provides a liquid crystal display panel, which may reduce the effect of two feed-through voltages on the display effect of the liquid crystal display device by setting the storage capacitance of one column of pixel units corresponding to the source line in the pixels substrate to be larger than the storage capacitance of any other column of pixel units. The display quality of the liquid crystal panel may be improved on the bases of reducing power consumption.

A liquid crystal display device including any of the foregoing liquid crystal display panel may be provided by the present disclosure.

Different from the related art, the present disclosure provides a liquid crystal display device, which may reduce the effect of two feed-through voltage on the display effect of the liquid crystal display device by setting the storage capacitance of one column of pixel units corresponding to the source line in the pixel substrate to be larger than the storage capacitance of any other column of pixel unit. The display quality of the liquid crystal panel may be improved on the basis of reducing power consumption.

The above description depicts merely some exemplary embodiments of the disclosure, but is not meant to limit the scope of the disclosure. Any equivalent structure or flow transformations made to the disclosure, or any direct or indirect applications of the disclosure on other related fields, shall all be covered within the protection of the disclosure.

What is claimed is:

1. A pixel substrate, comprising liquid crystal pixels, thin film transistors (TFTs), source lines, grid lines, common electrodes, and corresponding storage capacitances, wherein the TFTs are disposed among the source lines, the grid lines and the liquid crystal pixels;
    the liquid crystal pixels comprising a plurality of pixel units arranged in an array and comprising red (R) pixels, green (G) pixels, and blue (B) pixels, wherein each of the source lines is connected to the source/drain electrode of at least two columns of the pixel units, and the storage capacitance corresponding to one column of the pixel units is larger than the storage capacitance corresponding to any other columns of the pixel units;
    wherein when grid electrodes of the TFTs are turned off, the storage capacitances corresponding to R pixels is larger than the storage capacitances corresponding to G pixels or B pixels in an even timing sequence state of the sources lines, and the storage capacitances correspond to B pixels is larger than the storage capacitances corresponding to G pixels or R pixels in an odd timing sequence state of the source lines; and
    wherein before the grid electrodes of the TFTs are turned off, the storage capacitances corresponding to R pixels is larger than the storage capacitances corresponding to G pixels or B pixels in the even timing sequence state of the source lines, and the storage capacitances corresponding to B pixels is larger than the storage capacitances corresponding to G pixels or R pixels in the odd timing sequence state of the source lines.

2. The pixel substrate according to claim 1, wherein each switch signal line of a Demux driver corresponds to a column of the pixel units, and the switch signal lines control the signal transmission of the source lines;
    each of the grid lines is connected to the grid electrode of a row of the pixel units, and the grid lines and the source lines cooperate to control the pixel units to perform work.

3. The pixel substrate according to claim 2, wherein the Demux driver is a 1:n Demux driver architecture, where n is an integer greater than or equal to 2.

4. The pixel substrate according to claim 3, wherein the Demux driver is a 1:3 Demux driver architecture, each row is provided with three switch signal lines, which are a first signal line, a second signal line and a third signal line, the sequence period of the turn-on time is: the first signal line, the second signal line, the third signal line, the third signal line, the second signal line, and the first signal line.

5. The pixel substrate according to claim 1, wherein one end of each storage capacitance is connected to the common electrode or one of the grid lines.

6. The pixel substrate according to claim 1, wherein each of the source lines is connected to the source/drain electrode of at least two columns of pixel units, and the plate area of storage capacitance corresponding to one column of the pixel units is larger than the plate area of the storage capacitance corresponding to any other column of the pixel units.

7. The pixel substrate according to claim 1, wherein each of the source lines is connected to the source/drain electrode of at least two columns of pixel units, and the plate pitch of the storage capacitance corresponding to one column of the pixel units is less than the plate pitch of the storage capacitance corresponding to any other column of the pixel units.

8. The pixel substrate according to claim 1, wherein a driving frequency of a Demux driver corresponding to the R pixels in the odd timing sequence state of the source lines is higher than a driving frequency corresponding to the B pixels in the even timing sequence state of the source lines when the grid electrodes of the TFTs are turned off.

9. A liquid crystal display panel, comprising a pixel substrate, the pixel substrate comprising liquid crystal pixels, thin film transistors (TFTs), source lines, grid lines, common electrodes, and corresponding storage capacitances, wherein the TFTs are disposed among the source lines, the grid lines and the liquid crystal pixels;
the liquid crystal pixels comprising a plurality of pixel units arranged in an array and comprising red (R) pixels, green (G) pixels, and blue (B) pixels, wherein each of the source lines is connected to the source/drain electrode of at least two columns of the pixel units, and the storage capacitance corresponding to one column of the pixel units is larger than the storage capacitance corresponding to any other columns of the pixel units,
wherein when grid electrodes of the TFTs are turned off, the storage capacitances corresponding to R pixels is larger than the storage capacitances corresponding to G pixels or B pixels in an even timing sequence state of the source lines, and the storage capacitances corresponding to B pixels is larger than the storage capacitances corresponding to G pixels or R pixels in an odd timing sequence state of the sources lines; and
wherein before the grid electrodes of the TFTs are turned off, the storage capacitances corresponding to R pixels is larger than the storage capacitances corresponding to G pixels or B pixels in the even timing sequence state of the sources lines, and the storage capacitances corresponding to B pixels is larger than the storage capacitances corresponding to G pixels or R pixels in the odd timing sequence state of the sources lines.

10. The liquid crystal display panel according to claim 9, wherein each switch signal line of a Demux driver corresponds to a column of the pixel units, and the switch signal lines control the signal transmission of the source lines;
each of the grid lines is connected to the grid electrode of a row of the pixel units, and the grid lines and the source lines cooperate to control the pixel units to perform work.

11. The liquid crystal display panel according to claim 10, wherein the Demux driver is a 1:n Demux driver architecture, where n is an integer greater than or equal to 2.

12. The liquid crystal display panel according to claim 9, wherein one end of each storage capacitance is connected to the common electrode or one of the grid lines.

13. The liquid crystal display panel according to claim 9, wherein each of the source lines is connected to the source/drain electrode of at least two columns of pixel units, and the plate area of storage capacitance corresponding to one column of the pixel units is larger than the plate area of the storage capacitance corresponding to any other column of the pixel units.

14. The liquid crystal display panel according to claim 9, wherein each of the source lines is connected to the source/drain electrode of at least two columns of pixel units, and the plate pitch of the storage capacitance corresponding to one column of the pixel units is less than the plate pitch of the storage capacitance corresponding to any other column of the pixel units.

15. A liquid crystal display device, comprising a liquid crystal display panel, wherein the liquid crystal display panel comprises a pixels substrate, and the pixel substrate comprises liquid crystal pixels, thin film transistors (TFTs), source lines, grid lines, common electrodes, and corresponding storage capacitances, wherein the TFTs are disposed among the source lines, the grid lines and the liquid crystal pixels;
the liquid crystal pixels comprising a plurality of pixel units arranged in an array and comprising red (R) pixels, green (G) pixels, and blue (B) pixels, wherein each of the source lines is connected to the source/drain electrode of at least two columns of the pixel units, and the storage capacitance corresponding to one column of the pixel units is larger than the storage capacitance corresponding to any other columns of the pixel units,
wherein when grid electrodes of the TFTs are turned off, the storage capacitances corresponding to R pixels is larger than the storage capacitances corresponding to G pixels or B pixels in an even timing sequence state of the source lines, and the storage capacitances corresponding to B pixels is larger than the storage capacitances corresponding to G pixels or R pixels in an odd timing sequence state of the sources lines; and
wherein before the grid electrodes of the TFTs are turned off, the storage capacitances corresponding to R pixels is larger than the storage capacitances corresponding to G pixels or B pixels in the even timing sequence state of the sources lines, and the storage capacitances corresponding to B pixels is larger than the storage capacitances corresponding to G pixels or R pixels in the odd timing sequence state of the sources lines.

16. The liquid crystal display device according to claim 15, wherein each switch signal line of a Demux driver corresponds to a column of the pixel units, and the switch signal lines control the signal transmission of the source lines;
each of the grid lines is connected to the grid electrode of a row of the pixel units, and the grid lines and the source lines cooperate to control the pixel units to perform work.

17. The liquid crystal display device according to claim 16, wherein the Demux driver is a 1:n Demux driver architecture, where n is an integer greater than or equal to 2.

18. The liquid crystal display device according to claim 15, wherein one end of each storage capacitance is connected to the common electrode or one of the grid lines.

19. The liquid crystal display device according to claim 15, wherein each of the source lines is connected to the source/drain electrode of at least two columns of pixel units, and the plate area of storage capacitance corresponding to one column of the pixel units is larger than the plate area of the storage capacitance corresponding to any other column of the pixel units.

20. The liquid crystal display device according to claim 15, wherein each of the source lines is connected to the source/drain electrode of at least two columns of pixel units, and the plate pitch of the storage capacitance corresponding to one column of the pixel units is less than the plate pitch of the storage capacitance corresponding to any other columns of the pixel units.

* * * * *